(12) United States Patent
Bissett et al.

(10) Patent No.: US 7,577,961 B1
(45) Date of Patent: Aug. 18, 2009

(54) METHODS AND APPARATUS FOR EXCEPTION-BASED PROGRAMMING

(75) Inventors: Robert K. Bissett, Peabody, MA (US);
Ryan C. Shoemaker, Acton, MA (US);
Mark L. Roth, Brooklyn, NY (US)

(73) Assignee: Sun Microsystems, Inc., Santa Clara, CA (US)

(*) Notice: Subject to any disclaimer, the term of this patent is extended or adjusted under 35 U.S.C. 154(b) by 865 days.

(21) Appl. No.: 10/926,231

(22) Filed: Aug. 25, 2004

(51) Int. Cl.
*G06F 9/44* (2006.01)
*G06F 11/00* (2006.01)
*G06F 7/38* (2006.01)

(52) U.S. Cl. .................... 719/318; 719/316; 714/48; 712/244

(58) Field of Classification Search ............ 719/310, 719/318, 316; 714/6, 38, 41, 48, 49, 52, 714/53, 39, 51; 717/158; 712/233, 200, 712/201, 244
See application file for complete search history.

(56) References Cited

U.S. PATENT DOCUMENTS

| | | | | |
|---|---|---|---|---|
| 6,003,038 A * | 12/1999 | Chen | ................ | 707/103 R |
| 6,289,446 B1 * | 9/2001 | Nilsson | ................ | 712/244 |
| 6,477,666 B1 * | 11/2002 | Sanchez et al. | ................ | 714/41 |
| 6,546,396 B1 * | 4/2003 | Borkowski et al. | ................ | 707/102 |
| 6,617,969 B2 * | 9/2003 | Tu et al. | ................ | 340/517 |
| 7,017,162 B2 * | 3/2006 | Smith et al. | ................ | 719/328 |
| 7,120,901 B2 * | 10/2006 | Ferri et al. | ................ | 717/128 |
| 7,240,343 B2 * | 7/2007 | Ogasawara | ................ | 717/158 |
| 7,308,680 B2 * | 12/2007 | Grover et al. | ................ | 717/114 |
| 7,496,896 B2 * | 2/2009 | Bley et al. | ................ | 717/127 |
| 2002/0108028 A1 * | 8/2002 | Nunoe | ................ | 712/233 |
| 2004/0268330 A1 * | 12/2004 | Grover et al. | ................ | 717/146 |
| 2006/0004615 A1 * | 1/2006 | Guldner et al. | ................ | 705/7 |

OTHER PUBLICATIONS

Ogasawara et al. "A Study of Exception Handling and Its Dynamic Optimization in Java", ACM 2001, pp. 83-95.*
Xu et al. "Concurrent Exception Handling and Resolution in Distributed Object Systems", IEEE 2000, pp. 1019-1032.*
Lee et al. "Efficient Java Exception Handling in Just-in-Time Compilation", ACM 2000, pp. 1-8.*

* cited by examiner

*Primary Examiner*—Van H Nguyen
(74) *Attorney, Agent, or Firm*—Brooks Kushman P.C.

(57) ABSTRACT

In a programmed computer system, normal processing results generated by a called method are returned to one or more calling methods by an exception rather than by the more conventional single-type return value. The programmer is granted flexibility through the ability to use multiple normal return types while retaining strong data typing. Better programming practices are promoted through the use of a single exception-technique for handling normal results as well as abnormal (i.e. error) results. The disclosed technique can be used with existing programming languages/environments such as the Java® language, and can provide a basis for new languages/environments that are specifically tailored to this processing technique.

13 Claims, 3 Drawing Sheets

METHODS AND APPARATUS FOR EXCEPTION-BASED PROGRAMMING

BACKGROUND

The present invention generally relates to computer system programming techniques, and more particularly, to systems and techniques by which software routines such as library functions and program subroutines pass results to calling routines.

In existing computer programming languages, routines or "methods" are defined in part by a single "return value" whose type is typically included in the definition of the method. For example, a method definition may be structured as follows:

<return-value> <method-name> (<argument>*)<exception>* where the argument(s) and exception(s) are optional. As a specific example from the Java® programming language, a method for dividing two numbers may be written as follows:

```
float divideBy(float x, float y) throws DivError {
  if(y == 0) {
    throw new DivError( );
  }
  return x/y;
}
```

In the above example, the method divideBy generates a floating point return value equal to the quotient of the two inputs if the divisor input is not equal to zero. DivError is an exception object that is created if y is equal to zero. If this exception occurs, the execution of divideBy ceases immediately (i.e., the statement "return x/y" is not executed), and control is returned to the calling routine.

To utilize divideBy, a calling routine simply assigns its value to a variable. For example, in the following, the variable div_result obtains the result of dividing 500 by a variable z:

```
. . .
div_result = divideBy(500, z);
. . .
```

If a calling routine is to handle the exception DivError, it must include code for checking whether this exception has occurred and then performing appropriate processing:

```
try {
  div_result = divideBy(500, z);
} catch (DivError error) {
  //processing for the divide-by-zero error
}
```

While there may be multiple exception types that are generated by a method, there generally is only one return-type. If a method needs to return multiple types, it may do so by populating a separate object which a calling method accesses via a "get" method in the object. In this case, the return-type of the method is typically "void", i.e. the method does not return a value. Alternatively, the method may return a type that is more general than the desired return types. For example, if a method returns either an integer or an integer array, it may declare its return type to be simply "Object".

SUMMARY

In the conventional programming languages and methods as described above, the limitation of a single return-type is often problematic. It is very common for methods to generate multiple result types. For example, a simple matching routine may need to generate three different types as follows:

1. Array of items (e.g., strings) that match an input
2. A single item (e.g., string) that matches the input
3. Boolean(s) indicating that no match was found, and/or that an error occurred Using a conventional language, a programmer has to create a relatively complicated structure to convey the above results, or overload a single type by thoroughly specifying various states (e.g., use an empty or null return value to indicate that no match was found, rather than a separate Boolean variable). Moreover, if one of the above-described approaches is used (e.g., returning null or Object type), it requires that the calling routine(s) re-cast the result into the expected type and then operate on it. In doing so, calling routines often ignore all possible return types from the method, a problem that is generally not detectable by a compiler.

The present invention addresses these and other issues by providing mechanisms and techniques in a programmed computer system in which normal processing results generated by a called method are returned to one or more calling methods by an exception-like mechanism rather than by the more conventional single-type return value. The programmer is granted flexibility through the ability to use multiple normal return types while retaining strong data typing of results. Additionally, different results can be handled by different routines in the calling structure, providing added flexibility. Better programming practices are promoted, in part through the use of a single technique for handling normal results as well as abnormal (i.e. error) results, and in part through the ability of a compiler to check (1) that all return cases are handled by calling routine(s) and (2) that each return type is processed in a type-appropriate manner (i.e., normal type checking for each possible return type). The disclosed technique can be used with existing programming languages/environments such as the Java® language, and can provide a basis for new languages and computing environments that are specifically tailored to this processing technique.

According to one embodiment of the invention, a method is operative in response to a call by a calling method. The method includes performing an expected function within a normal flow of instructions operative to generate a normal processing result, the normal processing result being a first of a plurality of processing results of distinct types. It is then determined whether a first result condition exists, and if so then a first exception object is generated as an instance of a first exception object type. The first exception object contains the normal processing result, and the generating of the first exception object results in a return to the calling method. In the context of a Java implementation, this functionality is achieved by the called method "throwing" the first exception object, which is "caught" (i.e. processed) in the calling method. In one disclosed example, the first result condition is that the result of dividing two numbers is an integer, and the first exception object type is an integer type containing the integer result.

If the first result condition does not exist, then it is determined if a second result condition distinct from the first result condition exists, and if so then a second exception object is generated of a second exception object type distinct from the first exception object type. The second exception object contains a second one of the processing results, and the generating of the second exception object also results in a return to the calling method. The second processing result may be a second normal processing result, or it may be an abnormal/error result. In the disclosed division example, a float type is generated as part of a normal second result condition, and is subsequently converted to an integer. In another example of a second result condition, a called method determines whether a divisor input parameter (argument) is equal to zero, which is an error result. In this case, an exception object for holding an error message is generated.

In another aspect, a disclosed method of operating a programmed computer system includes a called method and one or more nested calling methods that collectively provide a normal flow of instructions for obtaining a normal processing result, the normal processing result being the first of a plurality of processing results. The method includes establishing distinct first and second exception object types. In the called method, an expected function is performed within the normal flow of instructions, and it is determined whether a first result condition exists. If so, a first exception object is generated as an instance of the first exception object type. The first exception object contains the normal processing result, and the generating of the first exception object results in a return to an immediately preceding one of the calling methods. If a second result condition distinct from the first result condition exists, then a second exception object is generated of the second exception object type. The second exception object contains a second one of the processing results, and the generating of the second exception object results in a return to the immediately preceding calling method.

Among the one or more calling methods, it is determined whether an object of the first exception object type has been generated by the called method, and if so then the normal processing result is processed from the first exception object. If an object of the second exception object type has been generated by the called method, then the second processing result is processed from the second exception object. In one embodiment, the determining and processing for both the first and second objects are carried out in an immediately preceding calling method, whereas in an alternative embodiment the determining and processing for the second exception object are performed in a higher-level calling method.

Other embodiments of the invention that are disclosed herein include software programs to perform the operations summarized above and disclosed in detail below. More particularly, a computer program product is disclosed which has a computer-readable medium including computer program logic encoded thereon to provide the called and calling methods according to the present invention. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION

Figure 1:
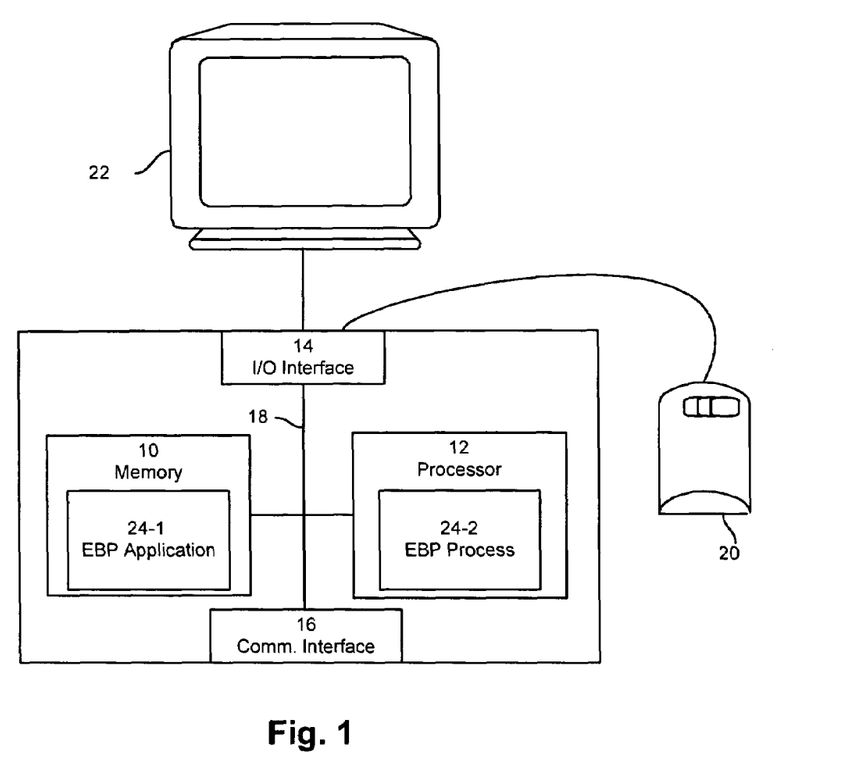
FIG. 1 is an exemplary computerized system storing and executing an exception-based programming (EBP) application in accordance with the present invention.

FIG. 1 illustrates an example arrangement of a computerized system configured according to embodiments of the invention. Although the illustrated configuration is typical of a so-called "client" or "desktop" system, it is to be understood that the disclosed techniques are equally applicable to other types of computerized systems, including so-called "server" and "embedded" computerized systems.

The computerized system includes a memory system 10, a processor 12, an input/output (I/O) interface 14 and a communications interface 16, all coupled together by an interconnection mechanism 18. The I/O interface 14 allows peripheral devices to be connected to the computerized system. In this example, coupled to the I/O interface 14 and operating as part of the computerized system are a peripheral input device 20 such as a mouse and/or a keyboard and a peripheral output device such as a computer display 22 upon which the computerized system can render or otherwise display visual images such as a graphical user interface. The communications interface 16 allows the computerized system to communicate with devices (i.e., resources) that operate within a network (not shown).

The memory system 10 is encoded with an exception-based programming (EBP) application 24-1, which represents software code such as data and/or logic instructions in storage (e.g., stored in the memory system 10 or on another computer readable medium such as a disk) that embody the processing functionality of embodiments of the invention. The processor 12 can access the memory system 10 via the interconnection mechanism 18 in order to launch, run, execute, interpret or otherwise perform the logic instructions of the EBP application 24-1 in order to produce an EBP process 24-2. In other words, the EBP process 24-2 represents one or more portions of the EBP application 24-1 (or the entire application 24-1) executing within or upon the processor 12 in the computerized system. It is to be understood that embodiments of the invention include the EBP application 24-1 (i.e., the non-executed or non-performing logic instructions and/or data) encoded within a computer readable medium such as a floppy disk, hard disk or optical medium, or in a memory system such as in firmware, read only memory (ROM) and/or random access memory (RAM). While not shown in this example, those skilled in the art will understand that the computerized system generally includes other processes and/or random access memory (RAM). While not shown in this example, those skilled in the art will understand that the computerized system generally includes other processes and/or software and hardware components, such as an operating system, compiler, interpreter etc., which have been left out of this illustration for ease of description of the invention.

Figure 2:
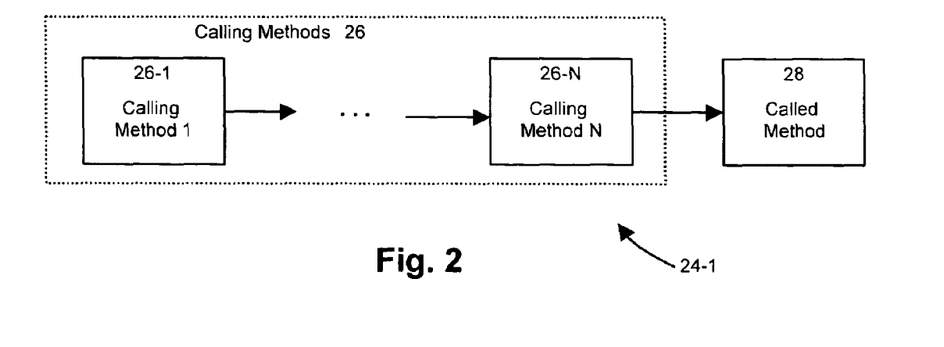
FIG. 2 is a diagram depicting the flow of control among calling and called methods in the EBP application of FIG. 1.

FIG. 2 illustrates a set of nested methods that are included in the EBP application 24-1. A first method 26-1 (which may be the main routine, or called by another routine not shown) calls a second method (not shown) and so on through an Nth method 26-N, which in turn calls yet another method 28. For purposes of the present description, the N methods 26 are referred to as "calling" methods, and the method 28 is referred to as the "called" method. It will be clear that the methods 26 perform both the function of calling as well as being called during operation (with the possible exception of method 26-1 which might not be called), and that the called method 26 may in turn call yet other methods. The "calling/called" terminology is employed herein merely to distinguish the methods in terms of their functionality with respect to the EBP techniques disclosed herein.

Figure 3:
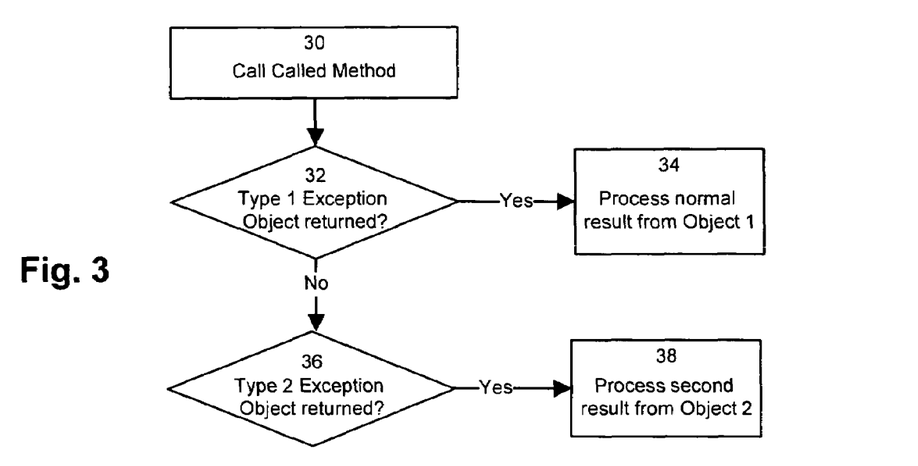
FIG. 3 is a flow diagram depicting pertinent operation of a calling method of FIG. 2.

FIG. 3 shows the pertinent operation of the calling methods 26. As explained in more detail below, the illustrated functionality may be performed by only one calling method, such as calling method 26-N, or it may be distributed among multiple calling methods 26. At step 30, the called method 28 is called. This call is part of a normal flow of instructions for obtaining a normal or desired result, an example of which is given below. After control is returned to the calling method 26, at step 32 it is determined whether an exception object (Object 1) of a first type (Type 1) has been generated by the called method 28. For illustrative purposes, it is assumed that Object 1, if existing, contains the normal result. If in step 32 it is determined that a Type 1 exception object has been generated, then the calling method 26 proceeds to step 34 in which it processes the normal result from Object 1. If in step 32 it is determined that a Type 1 exception object has not been generated, then the calling method 26 proceeds to step 36 in which it is determined whether an exception object (Object 2) of a second type (Type 2) has been generated. It is assumed that Object 2, if existing, contains a second processing result, which may be a second normal result or an abnormal or error result. If in step 36 it is determined that a Type 2 exception object has been generated, then the calling method 26 proceeds to step 38 in which it processes the second result from Object 2.

Although the above description refers to only two exception objects that could be generated as a result of calling the called method 28, in general there may be any number of exception objects that a calling method (or methods) may need to test for. Additionally, while the process of FIG. 3 includes explicit tests for each result condition, there may be default processing that is performed where a result condition can be implied. As a simple example, if a called method can return one of only two types, a calling method can explicitly check for one type, and in its absence perform the processing for the other type without the unnecessary step of determining whether the second type has been generated.

Figure 4:
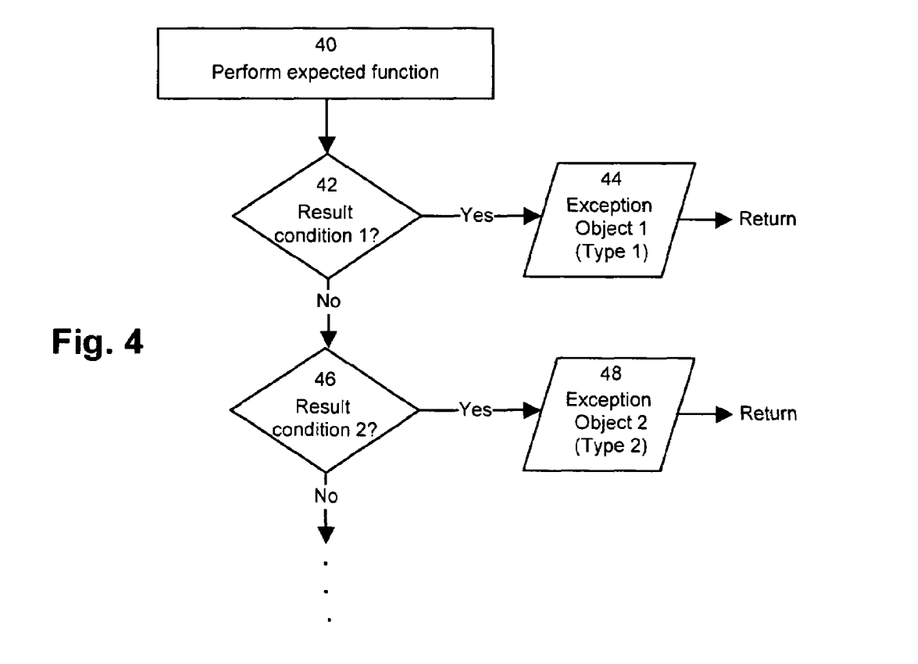
FIG. 4 is a flow diagram depicting pertinent operation of a called method of FIG. 2.

FIG. 4 shows the pertinent processing performed by the called method 28. At step 40, it performs a function that is expected by the calling method 26 as part of the normal instruction flow. It is assumed that the expected function can lead to one of a number of distinct results, at least one of which is a normal result. At step 42, it is determined whether a first type of result condition (result condition 1) exists, and if so then an exception object of a first type (Object 1) is generated at step 44. This exception object contains the normal result. The generating of the exception object Object 1 results in the termination of the execution of the called method, and ultimately control returns to the calling method (s) 26.

If at step 42 it is determined that result condition 1 does not exist, then processing proceeds to step 46 in which it is determined whether a second result condition (result condition 2) exists. If so, then an exception object of a second type (Object 2) is generated at step 48. This exception object contains a second type of result that is distinct from the normal result that is contained in Object 1 when generated. The generating of the exception object Object 2 likewise results in termination of the called method 28 and the return of control to the calling method(s) 26.

As indicated above, a called method generally may create any number of exception objects, for both normal as well as abnormal results. In an illustrative example appearing below, a called method generates three objects, each under different processing circumstances.

The illustrative example is now described with reference to FIG. 5 and a Java® program listing appearing below.

The example includes three result objects called IntResult, FloatResult, and BadResult, along with two objects called Divider and Client where the processing occurs. IntResult is used to hold an integer result of a divide operation performed by a divideNumbers method of the Divider object. FloatResult is used to hold a floating-point result from divideNumbers, and BadResult is used to store a text string for indicating that division by zero has been attempted. The method divideNumbers is called by a getResult method of the Client object, which also includes a main method that calls getResult.

Figure 5:
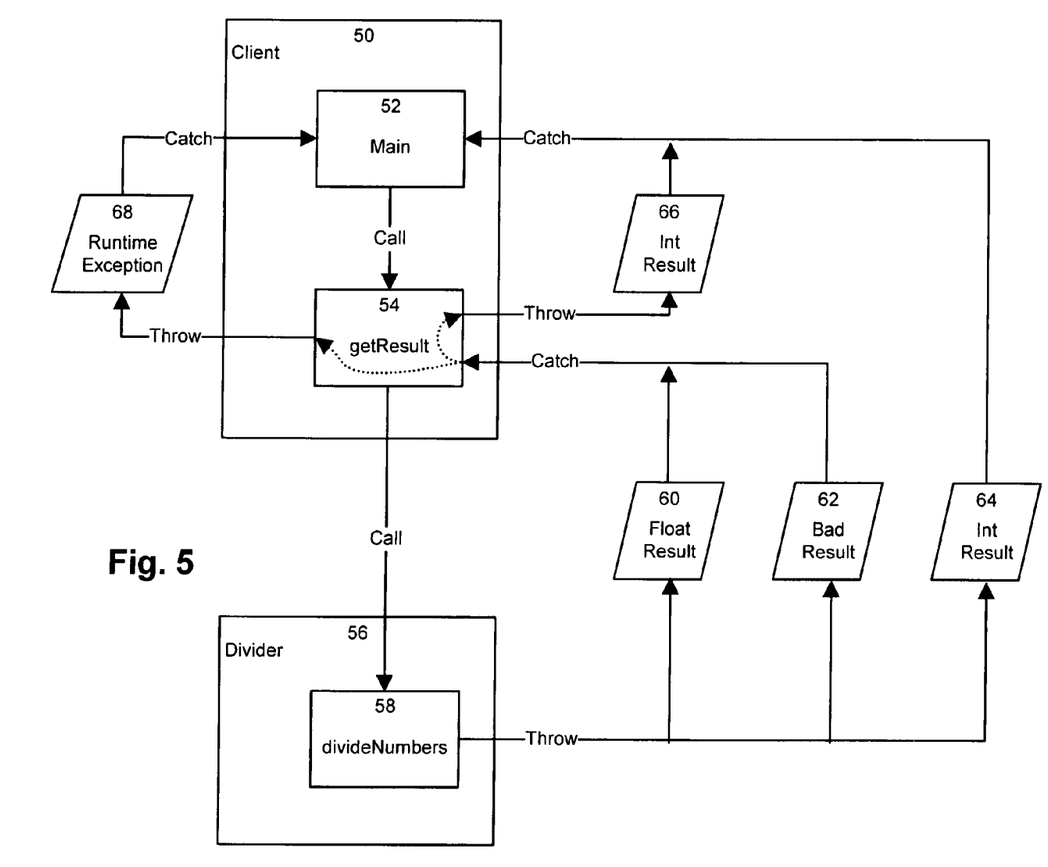
FIG. 5 is a diagram depicting where exception objects are generated and used in an exemplary EBP application for which a computer program listing appears in the Detailed Description below.

FIG. 5 shows the overall structure of this example code, including the Client object 50 with its main method 52 and getResult method 54, the Divider object 56 with its divideNumbers method 58, and various additional objects 60-68. The objects 60-68 are all "exception" objects, i.e., they fall within a Java class called "Exception".

Both the program listing and FIG. 5 use the terms "throw" and "catch" to indicate where exception objects are created and tested for, respectively. When a called method generates or "throws" an exception object, the execution of the method is immediately stopped and control is returned to the immediately-preceding calling method (corresponding to calling method 26-N in FIG. 2). Either the immediately-preceding calling method or a higher-level calling method (farther up the call chain) is responsible for "catching" the exception objects thrown by the called method, i.e., determining whether the exception objects have been generated and if so executing appropriate code for handling the exception results.

Referring to the program listing, it will be seen that the declaration for the method divideNumbers includes the statement "throws IntResult, FloatResult, BadResult". This statement identifies these exceptions as being generated by divideNumbers. A compiler keys off this statement to check whether these exceptions thrown by divideNumbers have corresponding catches somewhere higher up in the call stack (i.e., in either getResult or main). In the Java® language, these explicitly identified exceptions are called "checked" exceptions. While such checking by a compiler is seen as beneficial, in alternative embodiments such checking may be omitted.

As illustrated in FIG. 5, the method divideNumbers 58 throws the three exceptions IntResult 64, FloatResult 60 and BadResult 62. It will be understood that only one of these can be thrown in any given execution of divideNumbers 58, because execution will cease upon the first exception being thrown. But the single exception that can be thrown in any given execution has one of the three declared types. As shown in the listing, BadResult 62 is generated if divideNumbers 58 determines that the divisor b is zero. Otherwise, the division is carried out and it is determined whether there is any remainder in the result. If not, the result is an integer and IntResult 64 is generated. Otherwise, the result is a floating point value and FloatResult 60 is generated. These are examples of two different normal result conditions that can occur in the called method divideNumbers 58, which lead to generating the appropriate one of IntResult 64 or FloatResult 60.

Both FloatResult 60 and BadResult 62 are caught by the method getResult 54 within Client 50. If the getResult method 54 catches FloatResult 60, it rounds the value to an integer using the Java library function math.round and returns this integer to main in an IntResult exception object 66. If the getResult method 54 catches BadResult 62, it generates a RuntimeException object 68 flagging the error. Both of these operations can be viewed as examples of a routine "re-throwing" an exception, i.e., converting an exception that has been caught by the routine into another exception that is thrown by the routine. In this case, the newly-thrown exceptions are of different types than the corresponding input exceptions. It is of course possible for a routine to re-throw an exception of the same type it has received, which may be desirable in some circumstances. In other cases, it may be preferable to refrain from catching the exception in the routine (e.g., getResult) that immediately precedes the called routine, and catch it in a higher-level routine further up the chain (e.g., main).

The main routine in Client catches the IntResult objects 64 and 66 as well as the RuntimeException object 68. If an IntResult object 64 or 66 is caught, then a message showing the result of the dividing operation is displayed to a user. If RuntimeException 68 is caught, then an error message is displayed.

Programming Example

The following listing sets forth a set of software routines in the Java® programming language that represent an example embodiment of the invention. The operation of this example program is described above. This listing is part of the detailed disclosure of embodiments of the invention, as an illustrative example and not as a limiting description.

1. IntResult

```
/**
 * This is a Throwable object that contains an integer.
 */
public class IntResult extends Exception {
    // this stores the value being returned
    public int value;
    // Public constructor takes an integer
    public IntResult(int value) {
    super( );
    this.value = value;
    }
}
```

2. FloatResult

```
/**
 * This is a Throwable object that contains a float.
 */
public class FloatResult extends Exception {
    // this stores the value being returned
    public float value;
    // Public constructor takes a float
    public FloatResult(float value) {
    super( );
    this.value = value;
    }
}
```

3. BadResult

```
//*
 * This is an application-specific exception
 * for the Divider example.
 */
public class BadResult extends Exception {
    public BadResult(String message) {
    super(message);
    }
}
```

4. Divider

```
/**
 * This class has a single method that generates the result of
 * one number divided by another. It is a simple example of a
 * method that can "return" multiple object types.
 */
public class Divider {
    /*
     * The method will return a float result normally, an integer
     * result if there is no remainder of the division, and an
     * error if the divisor is zero.
     */
    public void divideNumbers(float a, float b) throws IntResult,
FloatResult, BadResult {
        if (b == 0) {
            // Throw BadResult; without the check Java would gen-
                erate
            // an ArithmeticException automatically.
            throw new BadResult("cannot divide by zero");
        }
        float result = a/b;
        // now check to see if there is a remainder or not
        if(result % 1 == 0) {
            throw new IntResult((int) result);
        } else {
            throw new FloatResult(result);
        }
    }
}
```

5. Client

```
public class Client {
    /*
     * This main method makes three calls to Client.getResult( )
     * to divide an integer by another integer. The code is only
     * interested in the integer part of the result.
     */
    public static void main(String[ ] args) {
    try {
        Client client = new Client( );
        // this method call should have a result of 2
        try {
            client.getResult(4, 2);
        } catch (IntResult ir) {
            System.out.println("Received result" + ir.value);
        }
        // this method should also result in 2: 7/3 rounded up
        try {
            client.getResult(7, 3);
        } catch (IntResult ir) {
            System.out.println("Received result" + ir.value);
        }
        // this method call should fail
        try {
            client.getResult(4, 0);
```

```
} catch (IntResult ir) {
    // this won't happen
    System.out.println("Received result" + ir.value);
}
} catch (RuntimeException re) {
    System.out.println("Received exception:" + re.getMes-
        sage( ));
}
}
/*
* The getResult method takes two numbers and divides one
    into the
* other. It uses the Divider to do the actual "work" and
* produces an integer result, rounding the result if it
* does not come back as an integer.
*/
void getResult(int x, int y) throws IntResult {
// create the Divider
Divider divider = new Divider( );
/*
    * Make the call to the divider. If the result is an integer,
    * there is no need to catch it -- it will automatically go
    * back to the caller. If it is a float, then round to the
    * nearest integer and throw it. If it is an error, throw
    * an exception.
    */
try {
    divider.divideNumbers(x, y);
} catch (FloatResult fr) {
    /*
        * Round result and return it. Note that the call to
            Math.round( )
        * is part of the Java math library. This code is returning
            a
        * value the "normal" way, not by throwing an excep-
            tion. It could
        * be rewritten, however, to throw an exception based
            response.
        */
    throw new IntResult(Math.round(fr.value));
} catch (BadResult br) {
    /*
        * This is an error by the calling code. At this point, the
        * getResult( ) method could rethrow the BadResult
            exception if
        * it declares it in the method signature. Since we have
        * not declared any other exceptions, we will throw a
            non-
        * checked exception.
        */
    throw new RuntimeException("error --" + br.getMes-
        sage( ));
}
}
}
```

Those skilled in the art will understand that there can be many variations made to the operations of the methods explained above while still achieving the same objectives of the invention. Such variations are intended to be covered by the scope of this invention. As such, the foregoing description of embodiments of the invention are not intended to be limiting. Rather, any limitations to embodiments of the invention are presented in the claims below.

What is claimed is:

1. A method of operating a programmed computer system having a microprocessor in communication with a memory having data representing instructions for the microprocessor, the instructions including a called method and one or more nested calling methods, the called and calling methods collectively providing a normal flow of instructions for obtaining a normal processing result stored in the memory, the normal processing result being the first of a plurality of processing results, comprising:

establishing distinct first and second exception object types in the memory;

in the called method, sending instructions to the microprocessor for: (i) performing an expected function within the normal flow of instructions, (ii) determining if a first result condition exists, and if so then generating a first exception object as an instance of the first exception object type, the first exception object containing the normal processing result, the generating of the first exception object resulting in a return to an immediately preceding one of the calling methods, and (iii) determining if a second result condition distinct from the first result condition exists, and if so then generating a second exception object of the second exception object type, the second exception object containing a second of the processing results, the generating of the second exception object resulting in a return to the immediately preceding calling method; and among the one or more calling methods, sending instructions to the microprocessor for (i) calling the called method, (ii) determining whether an object of the first exception object type has been generated by the called method, and if so then processing the normal processing result from the first exception object, and (iii) determining whether an object of the second exception object type has been generated by the called method, and if so then processing the second processing result from the second exception object;

wherein the immediately preceding calling method is operative to: (i) determine whether an object of the first exception object type has been generated by the called method, and if so then process the normal processing result from the first exception object, and (ii) determine whether an object of the second exception object type has been generated by the called method, and if so then process the second processing result from the second exception object.

2. The method according to claim 1, wherein a higher-level calling method is operative to determine whether an object of the second exception object type has been generated by the called method, and if so then to process the second processing result from the second exception object.

3. The method according to claim 1, wherein the immediately preceding calling method is operative to determine whether an object of the second exception object type has been generated by the called method, and if so then to generate a third exception object of a third exception object type, the third exception object containing a third of the processing results, the generating of the third exception object resulting in a return to a higher-level calling method.

4. The method according to claim 3, wherein the third exception object type is the same as the second exception object type.

5. The method according to claim 3, wherein the third exception object type is different from the second exception object type.

6. The method according to claim 1, wherein the first and second exception object types are explicitly declared as being generated by the called methods so as to enable a compiler to check whether each is detected and processed within the calling methods.

7. A computer system comprising:
  an input-output interface;
  a processor; and
  a memory system coupled to the processor and to the input-output interface and encoded with instructions implementing a called method and one or more nested calling methods, the called and calling methods collectively providing a normal flow of instructions for obtaining a normal processing result, the normal processing result being the first of a plurality of processing results, such that the called and calling methods, when performed on the processor, cause the computer system to perform the operations of:
    establishing distinct first and second exception object types;
    in the called method, (i) performing an expected function within the normal flow of instructions, (ii) determining if a first result condition exists, and if so then generating a first exception object as an instance of the first exception object type, the first exception object containing the normal processing result, the generating of the first exception object resulting in a return to an immediately preceding one of the calling methods, and (iii) determining if a second result condition distinct from the first result condition exists, and if so then generating second exception object of the second exception object type, the second exception object containing a second of the processing results, the generating of the second exception object resulting in a return to the immediately preceding calling method; and
    among the one or more calling methods, (i) calling the called method, (ii) in either the immediately preceding calling method or a higher level calling method: (iia) determining whether an object of the first exception object type has been generated by the called method, and if so then processing the normal processing result from the first exception object, and (iib) determining whether an object of the second exception object type has been generated by the called method, and if so then processing the second processing result from the second exception object;
    wherein the immediately preceding calling method is operative to: (i) determine whether an object of the first exception object type has been generated by the called method, and if so then process the normal processing result from the first exception object, and (ii) determine whether an object of the second exception object type has been generated by the called method, and if so then process the second processing result from the second exception object.

8. A computer system according to claim 7, wherein a higher-level calling method is operative to determine whether an object of the second exception object type has been generated by the called method, and if so then to process the second processing result from the second exception object.

9. The computer system according to claim 7, wherein the immediately preceding calling method is operative to determine whether an object of the second exception object type has been generated by the called method, and if so then to generate a third exception object of a third exception object type, the third exception object containing a third of the processing results, the generating of the third exception object resulting in a return to a higher-level calling method.

10. The computer system according to claim 9, wherein the third exception object type is the same as the second exception object type.

11. The computer system according to claim 9, wherein the third exception object type is different from the second exception object type.

12. The computer system according to claim 7, wherein the first and second exception object types are explicitly declared as being generated by the called methods so as to enable a compiler to check whether each is detected and processed within the calling methods.

13. A computer program product having a computer-readable medium including computer program logic encoded thereon that when performed on a computer system provides a called method and one or more nested calling methods, the called and calling methods collectively providing a normal flow of instructions for obtaining a normal processing result, the normal processing result being the first of a plurality of processing results, wherein when the computer program logic is performed on a processor in the computer system, the computer program logic causes the processor to perform the operations of:
  establishing distinct first and second exception object types;
  in the called method, (i) performing an expected function within the normal flow of instructions, (ii) determining if a first result condition exists, and if so then generating a first exception object as an instance of the first exception object type, the first exception object containing the normal processing result, the generating of the first exception object resulting in a return to an immediately preceding one of the calling methods, and (iii) determining if a second result condition distinct from the first result condition exists, and if so then generating a second exception object of the second exception object type, the second exception object containing a second of the processing results, the generating of the second exception object resulting in a return to the immediately preceding calling method; and
  among the one or more calling methods, (i) calling the called method, (ii) determining whether an object of the first exception object type has been generated by the called method, and if so then processing the normal processing result from the first exception object, and (iii) determining whether an object of the second exception object type has been generated by the called method, and if so then processing the second processing result from the second exception object;
  wherein the immediately preceding calling method is operative to: (i) determine whether an object of the first exception object type has been generated by the called method, and if so then process the normal processing result from the first exception object, and (ii) determine whether an object of the second exception object type has been generated by the called method, and if so then process the second processing result from the second exception object.

* * * * *

UNITED STATES PATENT AND TRADEMARK OFFICE
CERTIFICATE OF CORRECTION

PATENT NO.       : 7,577,961 B1  
APPLICATION NO. : 10/926231  
DATED            : August 18, 2009  
INVENTOR(S)      : Bissett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this

Seventh Day of September, 2010

David J. Kappos  
*Director of the United States Patent and Trademark Office*